April 20, 1926.
F. W. CALDWELL
1,581,530
TRANSMISSION DYNAMOMETER
Filed Jan. 26, 1923  2 Sheets-Sheet 1
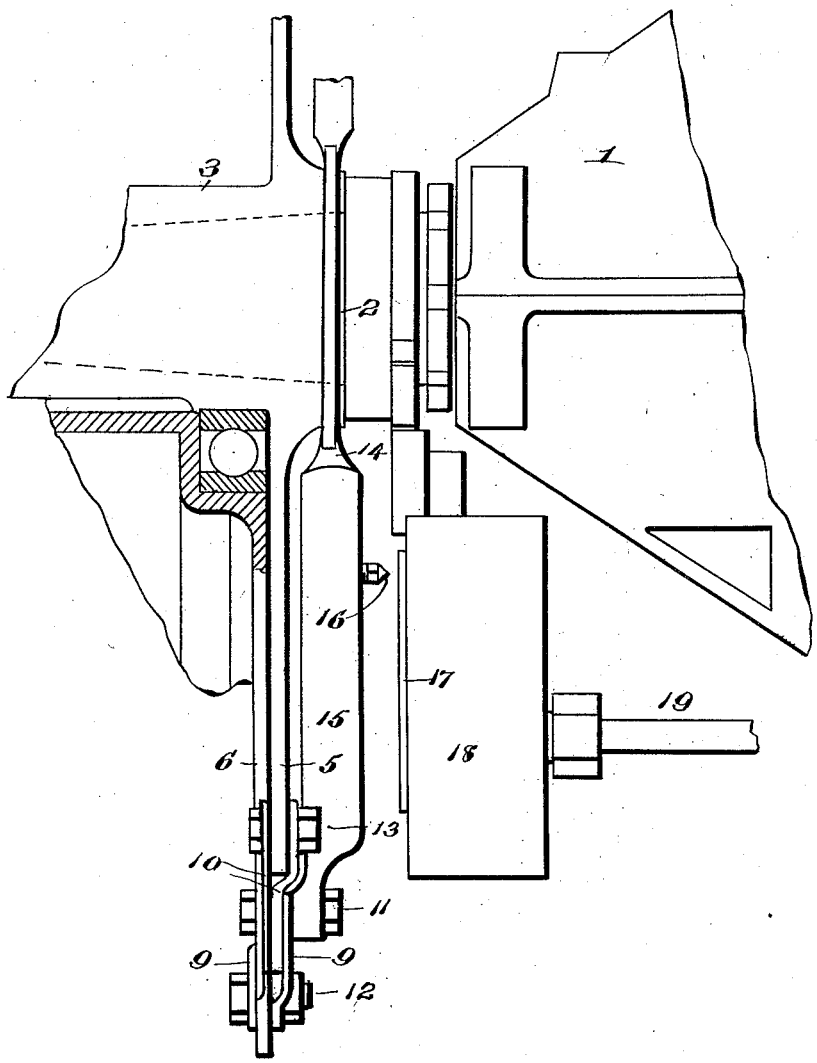

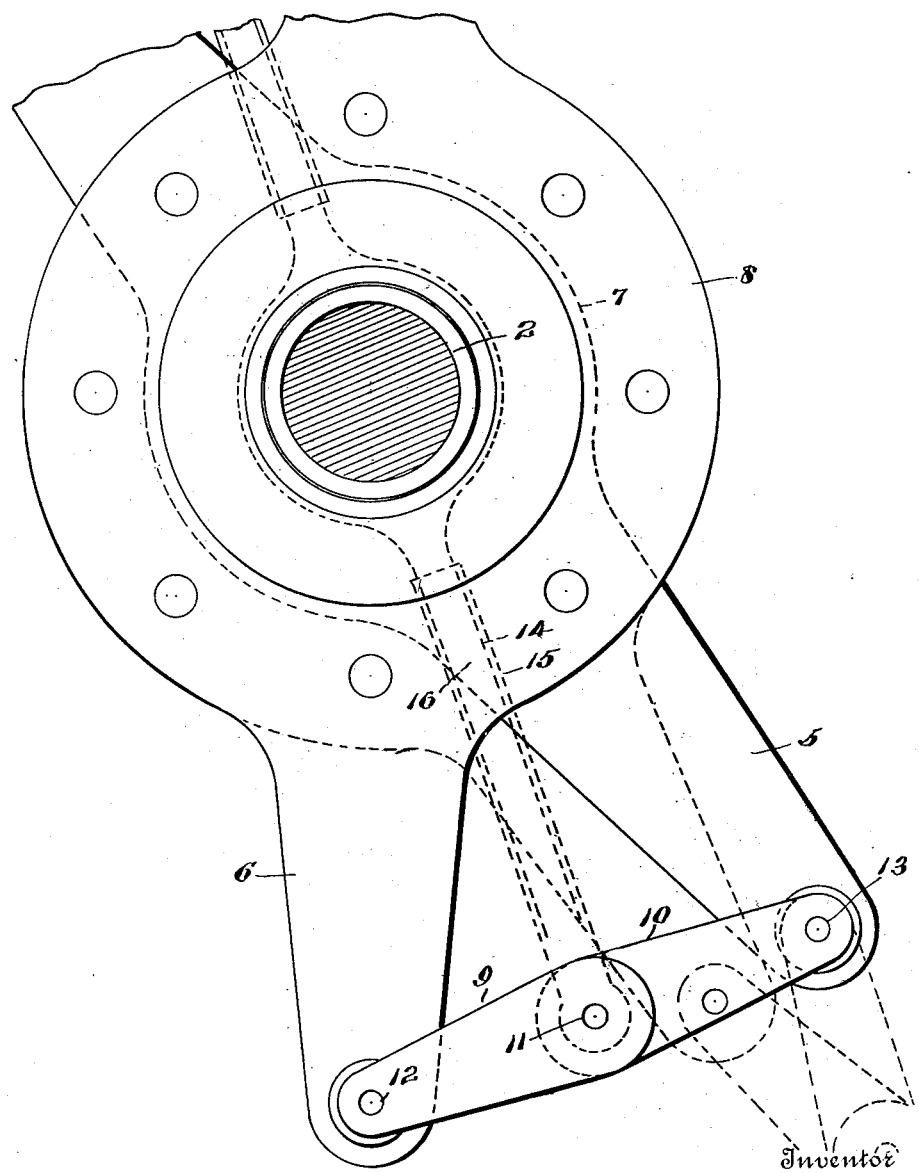

Patented Apr. 20, 1926.

1,581,530

UNITED STATES PATENT OFFICE.

FRANK W. CALDWELL, OF DAYTON, OHIO.

TRANSMISSION DYNAMOMETER.

Application filed January 26, 1923. Serial No. 615,142.

*To all whom it may concern:*

Be it known that I, FRANK W. CALDWELL, a citizen of the United States, residing at Dayton, in the county of Montgomery and State of Ohio, have invented certain new and useful Improvements in Transmission Dynamometers, of which the following is a specification.

This invention relates to transmission dynamometers, or what may be termed torque meters. The object of the invention is to produce a simple, strong, reliable and accurate device for indicating the torque coefficient of one or more rotary elements, the device being especially designed for use and illustrated as combined with the engine shaft and propeller hub of an airplane or other type of aircraft.

In carrying out the present invention, advantage is taken both of the pull of one rotary element on the other and the centrifugal force exerted on certain part or parts of the device for indicating the torque and in some instances it is also proposed to use means for dampening out the oscillations of the movable part or parts of the mechanism to insure greater accuracy in reading or recording the torque coefficient.

With the above and other objects in view, the invention consists in the novel construction, combination and arrangement herein fully described, shown and claimed.

In the accompanying drawings—

Figure 1 is a fragmentary side elevation of the forward part of an aeronautical engine showing also a fragment of the propeller and the dynamometer or torque meter in its applied relation thereto;

Figure 2 is a front elevation of the same.

Referring to the drawings which illustrate the applied position of the dynamometer or torque meter 1 designates one end of the crank case of an internal combustion engine, 2 the engine shaft and 3 the propeller hub.

In the illustrated embodiment of the invention I employ two arms 5 and 6; the arm 5 having a collar 7 which embraces and is fastened to the engine shaft 2. The other arm 6 embodies a collar 8 which is fastened to the hub of the propeller 3. The arm 5 is actuated by the engine shaft and forms the driving arm or element of the transmission dynamometer or torque meter, while the arm 6 on the propeller constitutes the driven element or arm of the torque meter. The arms 5 and 6 have interposed between the outer extremities thereof a flexible or deformable connector which is composed of links 9 and 10 connected together by means of a pivot 11, the link 9 being connected to the arm 6 by a pivot 12 and the link 10 being connected to the arm 5 by a pivot 13.

In conjunction with the parts above described, I may also use an oscillation damper which is shown as consisting of a dash pot embodying telescopic male and female members 14 and 15, respectively. The female member 15 is shown as carrying a stylus 16 which operates against a record card or sheet 17 carried by the rotary drum 18 of a recording instrument, the drum being operated by a suitable driving shaft 19. The outer extremity of the dash pot is shown as connected to the pivot 11 connecting the inner adjacent ends of the links 9 and 10.

In operation, the driver arm 5 propelled by the engine shaft exerts a pull on the driven arm 6 through the medium of the flexible connector composed of the links 9 and 10. It may be noted that the arms 5 and 6, as well as the flexible connector are duplicated at opposite sides of the axis of rotation of the rotary parts of the mechanism. The torques of the engine tend to separate the arms 5 and 6 angularly to the greatest extent possible and to keep the links 9 and 10 in alinement with each other, as shown in full lines in Figure 2. In opposition to this tendency centrifugal force tends to move the pivot 11 radially outward, due to the mass of the links, the pivot pin and the outer member of the dash pot. When these opposing forces are balanced, the arms 5 and 6 will have a certain angular relation to each other. Then, when centrifugal force is greater, the link pivot 11 will move outwardly and will draw the arms 5 and 6 toward each other. Now, since the torque and centrifugal forces are both proportionate to the square of the R. P. M. the radial movement of the stylus will represent accurately variations in torque. The masses of the links 9 and 10 are such that at higher torques, and consequently higher speeds, centrifugal force predominates and moves the links to the dotted positions, Fig. 2. The dash pot is included simply to damp out slight oscillations of the links, due to vibration. Since the centrifugal force is proportionate to the square of the revolution, the quantity of centrifugal force divided by the square of revolution is independent of speed for indicating opposition of the flexible connector. Consequently, any given opposition of the connector, or the opposition of the stylus establishes a definite relation between the centrifugal force divided by the square of the revolutions, and the torque divided by the square of the revolutions. By means of calculations and check calibration, the position or reading of the stylus will then give a quantity by which to multiply the square of the revolutions in order to obtain the torque; in other words the position or reading of the stylus will measure directly the quantity of torques divided by the square of revolutions. It is therefore obvious that the position or reading of the stylus, which is a measure of torques divided by the revolutions squared, will give the torque coefficient of the propeller directly and will be an especially valuable feature for propeller tests. In the past it has been customary to attempt to measure torque directly, and revolutions at the same time, and then divide the torque by the square of the revolutions in order to obtain the torque coefficient. By means of the instrument above described the torque coefficient is measured directly, thus eliminating errors due to readings of revolutions.

What I claim is:—

1. In a transmission dynamometer for indicating the torque coefficient between two rotary elements, a driving member actuated by one of said elements, a driven member for actuating the other of said elements, a deformable centrifugally influenced connector between said driving member and driven member, means for dampening the oscillations of said deformable member, and means controlled by said deformable member for indicating the torque coefficient in accordance with speed of rotation of the rotary elements.

2. In a transmission dynamometer, the combination of a driving member, a driven member, and a deformable tension transmitting connection between said members, the mass of the connection being such that at higher speeds, centrifugal force throws the tension transmitting connection outwardly and draws the driving and driven members closer together.

3. In a transmission dynamometer the combination of a driving member, a driven member, a deformable tension transmitting connection between said members, the mass of the connection being such that at higher speeds, centrifugal force throws the tension transmitting connection outwardly and draws the driving and driven members closer together, and means for measuring the movements of the tension transmitting connections.

4. In a transmission dynamometer, the combination of a driving member, a driven member, a deformable tension transmitting connection between said members, the mass of the connection being such that at higher speeds centrifugal force throws the tension transmitting connection outwardly and draws the driving and driven members closer together, means for measuring the movements of the tension transmitting connections, and means for damping the movements of said connections.

5. In a transmission dynamometer, the combination of a driving member, a driven member, and a pair of links pivoted to each other and respectively pivoted to the driving and driven members, the mass of the links being such that at higher speeds centrifugal force throws them outwardly and draws the driving and driven members closer together.

6. In a transmission dynamometer, the combination of a driving member, a driven member, a pair of links pivoted to each other and respectively pivoted to the driving and driven members, the mass of the links being such that at higher speeds centrifugal force throws them outwardly and draws the driving and driven members closer together, and means for measuring the movements of the links.

7. In a transmission dynamometer, the combination of a driving member, a driven member, a pair of links pivoted to each other and respectively pivoted to the driving and driven members, the mass of the links being such that at higher speeds centrifugal force throws them outwardly and draws the driving and driven members closer together, means for measuring the movement of the links, and means for damping movement of the links.

In testimony whereof I affix my signature.

FRANK W. CALDWELL.